(12) United States Patent
Fröhlich et al.

(10) Patent No.: US 12,294,248 B2
(45) Date of Patent: May 6, 2025

(54) ROTOR SHAFT ARRANGEMENT FOR AN ELECTRIC MACHINE

(71) Applicant: Vitesco Technologies GMBH, Hannover (DE)

(72) Inventors: Holger Fröhlich, Berlin (DE); Isao Fukumoto, Berlin (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 759 days.

(21) Appl. No.: 17/197,136

(22) Filed: Mar. 10, 2021

(65) Prior Publication Data

US 2021/0194304 A1    Jun. 24, 2021

Related U.S. Application Data

(63) Continuation of application No. PCT/EP2019/073227, filed on Aug. 30, 2019.

(30) Foreign Application Priority Data

Sep. 21, 2018  (DE) .................... 10 2018 216 120.8

(51) Int. Cl.
*H02K 1/32*    (2006.01)
*H02K 7/00*    (2006.01)
*H02K 9/197*   (2006.01)

(52) U.S. Cl.
CPC .............. *H02K 1/32* (2013.01); *H02K 7/003* (2013.01); *H02K 9/197* (2013.01)

(58) Field of Classification Search
CPC   H02K 9/19; H02K 9/197; H02K 1/32; H02K 7/003

(Continued)

(56) References Cited

U.S. PATENT DOCUMENTS

2003/0146667 A1    8/2003  Hattori et al.
2019/0115805 A1*   4/2019  Do ..................... B60L 50/50

FOREIGN PATENT DOCUMENTS

DE    102009029716 A1    12/2009
DE    102011108008 A1     1/2013
(Continued)

OTHER PUBLICATIONS

International Search Report and Written Opinion dated Dec. 3, 2019 from corresponding International Patent Application No. PCT/EP2019/073227.

(Continued)

*Primary Examiner* — Jose A Gonzalez Quinones

(57) ABSTRACT

A rotor shaft arrangement for an electric motor or for an electrodynamic machine. The rotor shaft arrangement has a rotor shaft, and a fluid passage, which is arranged at least partially within the rotor shaft and is designed to carry a cooling fluid along a longitudinal extent direction of the fluid passage. The rotor shaft arrangement furthermore has at least one feed channel, which is arranged at least partially within the rotor shaft and is connected to the fluid passage at one end of the fluid passage. The at least one feed channel is configured and/or designed to produce fluid communication between the fluid passage and a fluid feed that stores the cooling fluid, wherein the feed channel is arranged with respect to the longitudinal extent direction of the fluid passage so as to form a bend at the end of the fluid passage.

18 Claims, 3 Drawing Sheets

(58) Field of Classification Search
USPC .............................. 310/52, 54, 58, 59, 60 A
See application file for complete search history.

(56) References Cited

FOREIGN PATENT DOCUMENTS

| | | | |
|---|---|---|---|
| DE | 102014117382 A1 * | 6/2016 | |
| DE | 102015223073 A1 * | 5/2017 | ............... H02K 9/19 |
| DE | 102016202416 A1 | 8/2017 | |
| DE | 102016007328 A1 | 12/2017 | |
| WO | WO-2017215686 A1 * | 12/2017 | ............... H02K 1/32 |

OTHER PUBLICATIONS

German Office Action dated May 16, 2019 for corresponding German Patent Application No. 10 2018 216 120.8.

* cited by examiner

ROTOR SHAFT ARRANGEMENT FOR AN ELECTRIC MACHINE

CROSS-REFERENCE TO RELATED APPLICATIONS

This application claims priority to PCT Application PCT/EP2019/073227, filed Aug. 30, 2019, which claims priority to German Patent Application No. DE 10 2018 216 120.8, filed Sep. 21, 2018. The disclosures of the above applications are incorporated herein by reference.

FIELD OF THE INVENTION

The invention relates to a rotor shaft arrangement for an electric machine having a fluid passage within a rotor shaft of the rotor shaft arrangement.

BACKGROUND OF THE INVENTION

Many electric motors, electric machines and/or electrodynamic machines have a rotor shaft arrangement with a rotor shaft and a fluid passage within the rotor shaft, e.g. as an oil feed or as a passage for cooling liquid. In this case, the fluid gets into the fluid passage of the rotor shaft via holes. In this design, however, the fluid feed may be disrupted, especially at relatively high speeds of the rotor shaft, e.g. because of centrifugal forces, which force the fluid against the wall of the fluid passage and/or to the holes and hence impair introduction and/or transfer of the fluid through the fluid passage.

SUMMARY OF THE INVENTION

The object of the invention is to provide an improved rotor shaft arrangement for an electric machine and/or an electric motor.

The object is achieved by the subject matter described herein. Advantageous embodiments are indicated in the following description and in the Figures.

One aspect of the invention relates to a rotor shaft arrangement for an electric machine and/or an electric motor. In this case, the rotor shaft arrangement has a rotor shaft and a fluid passage, which is arranged at least partially within the rotor shaft and is designed to carry a cooling fluid along a longitudinal extent direction of the fluid passage, wherein the longitudinal extent direction of the fluid passage is parallel to an axial direction and/or a longitudinal extent direction of the rotor shaft. The rotor shaft arrangement furthermore has at least one feed channel, which is arranged at least partially within the rotor shaft and is connected to the fluid passage at one end of the fluid passage, wherein the at least one feed channel is configured and/or designed to produce fluid communication between the fluid passage and a fluid feed that stores the cooling fluid, and wherein the feed channel is arranged with respect to the longitudinal extent direction of the fluid passage so as to form a bend at the end of the fluid passage.

In this case, the rotor shaft arrangement has the rotor shaft. In an embodiment, the rotor shaft is part of an electric motor and/or of an electric machine. It is also possible for the rotor shaft to be part of some other machine connected directly or indirectly to the electric motor.

The rotor shaft arrangement furthermore has a fluid passage, which is arranged at least partially within the rotor shaft. Here, the fluid passage is formed in the rotor shaft. In other words, the rotor shaft and the fluid passage may be of integral design. In an embodiment, the fluid is a cooling fluid, for example, in an embodiment, a dielectric cooling fluid, but it may also be some other fluid, e.g. an oil, such as a lubricating oil and/or a hydraulic oil. In an embodiment, the fluid passage is arranged coaxially with a rotor axis of the rotor shaft. In this case, the axial direction of the rotor shaft is parallel to the rotor axis.

The rotor shaft arrangement furthermore has at least one feed channel, which is arranged at least partially within the rotor shaft and is connected to the fluid passage at one end of the fluid passage and/or is in fluid communication therewith. The at least one feed channel is configured and/or designed to produce fluid communication between the fluid passage and a fluid feed that stores the cooling fluid. By virtue of this arrangement, the cooling fluid is conveyed from the fluid feed into the fluid passage via the at least one feed channel. In this case, the feed channel is arranged with respect to the longitudinal extent direction of the fluid passage so as to form a bend at the end of the fluid passage. In other words, the fluid passage, together with the at least one feed channel, is of bent configuration. The at least one feed channel may thus be arranged so as to form an inflection and/or a curve between the longitudinal extent direction of the feed channel and the longitudinal extent direction of the fluid passage at the end of the fluid passage. The bend, the curve and/or the inflection may as it were be formed at the end of the fluid passage and/or in one region of this end. In an embodiment, the longitudinal extent direction of the feed channel is transverse to the longitudinal extent direction of the fluid passage. Alternatively or in addition, a longitudinal axis of the feed channel is oblique and/or skewed with respect to a longitudinal axis of the fluid passage.

As a result of the rotor shaft arrangement, the effect of the centrifugal force on the cooling fluid during rotation of the rotor shaft arrangement is, at least partially, counteracted because, owing to the bend, only part of the centrifugal force acts on the cooling fluid, and therefore the introduction and/or transfer of the cooling fluid through the fluid passage is ensured even at relatively high speeds of the rotor shaft. The result is therefore a significantly more reliable supply of cooling fluid because a reduction in pressure due to the centrifugal force is counteracted. The production of this rotor shaft arrangement may furthermore be accomplished quite easily and cheaply.

In one embodiment, in a longitudinal section plane through the rotor shaft, the bend has a first bend angle between a longitudinal extent direction of the feed channel and the longitudinal extent direction of the fluid passage. In this case, the longitudinal extent direction of the fluid passage is given and/or defined by a projection of the longitudinal central axis of the fluid passage into the longitudinal section plane, and the longitudinal extent direction of the feed channel is given and/or defined by a projection of the longitudinal central axis of the feed channel into the longitudinal section plane. The first bend angle is between 95° and 175°, in one embodiment, is between 100° and 150°, e.g. between 110° and 140°. This bend in the longitudinal extent direction of the feed channel relative to the longitudinal extent direction of the fluid passage may allow a significantly lower loss of fluid from the fluid passage because the deflection of the fluid takes place at an obtuse angle. At an angle of 90° between the longitudinal extent direction of the feed channel and the longitudinal extent direction of the fluid passage, a centrifugal force on the cooling fluid would be significantly higher, which would result in a higher loss of cooling fluid, especially at high speeds.

In one embodiment, in a cross section plane through the rotor shaft, the bend has a second bend angle between a projection of the longitudinal extent direction of the feed channel into the cross section plane and a radial direction of the fluid passage. The feed channel may as it were be arranged and/or designed in such a way that an offset is formed between the projection of the longitudinal extent direction and/or a longitudinal axis of the feed channel with respect to a longitudinal central axis of the fluid passage. The second bend angle is between 10° and 80°, in one embodiment, is between 30° and 60°, e.g. between 30° and 40°. The second bend angle not only makes an additional contribution to keeping the loss of fluid from the fluid passage as low as possible but also has the additional effect as it were of "scooping" the fluid out of a fluid supply, e.g. a reservoir, into the feed channel, i.e. of improving the feeding of the fluid into the feed channel.

In one embodiment, the fluid passage has at the end a widening in the longitudinal extent direction of the fluid passage, wherein the widening has an acute angle in relation to the longitudinal extent direction of the fluid passage. In this case, the angle of the widening is measured between a tangent to a wall or inner surface of the fluid passage and the longitudinal extent direction of the fluid passage. This widening makes a further contribution to keeping the loss of fluid from the fluid passage as low as possible. Moreover, the widening contributes to the fluid undergoing an additional pressure in the direction of the widening and/or in the longitudinal extent direction of the fluid passage owing to the centrifugal force, especially at relatively high speeds.

In one embodiment, the acute angle of the widening is in a range of from 1° to 30°, and in an embodiment, is from 1° to 15°, e.g. from 1° to 10°. These angles have proven to be suitable in practice for the stated advantageous effects.

In one embodiment, the rotor shaft arrangement has a plurality of feed channels, which are spaced apart from one another in the circumferential direction of the fluid passage and/or in the circumferential direction of the rotor shaft. This contributes in an advantageous manner to increasing a flow of fluid through the fluid passage.

In one embodiment, the rotor shaft is connected to the fluid passage and to the at least one feed channel for conjoint rotation therewith. This contributes to stable conditions for the fluid dynamics in the fluid passage and in the feed channel. Alternatively or in addition, the rotor shaft, the fluid passage and the feed channel are of integral design.

In one embodiment, the rotor shaft has a first portion, in which the at least one feed channel is arranged, and a second portion, in which the fluid passage is arranged. In this case, an outside diameter of the first portion is smaller than an outside diameter of the second portion of the rotor shaft, with the result that an annular channel is formed in the first portion along an outer circumference of the rotor shaft. The annular channel may promote an improvement in the feeding of the fluid into the feed channel. In an embodiment, the annular channel is similar in design to channeling in the rotor shaft.

In one embodiment, the rotor shaft arrangement furthermore has a trough-shaped fluid feed, which has a semicircular trough portion and which is configured for feeding the cooling fluid to the at least one feed channel of the rotor shaft arrangement. In this case, the first portion of the rotor shaft, in which the annular channel is arranged, is accommodated at least partially in the semicircular trough portion, with the result that, when the rotor shaft rotates, cooling fluid is conveyed out of the fluid feed into the fluid passage via the at least one feed channel.

In one embodiment, the first portion of the rotor shaft is arranged in such a way in the semicircular trough portion that a center of curvature of the semicircular trough portion is arranged eccentrically with respect to a rotor axis of the rotor shaft. As a result, a tapering gap is formed between the semicircular trough portion and the rotor shaft, thereby furthermore improving the feeding of fluid into the feed channel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

For further clarification, the invention will now be described on the basis of exemplary embodiments shown in the Figures.

FIG. 1b: shows a longitudinal section of the rotor shaft arrangement in FIG. 1a;

DETAILED DESCRIPTION OF THE PREFERRED EMBODIMENTS

The following description of the preferred embodiment(s) is merely exemplary in nature and is in no way intended to limit the invention, its application, or uses.

Figure 1A:
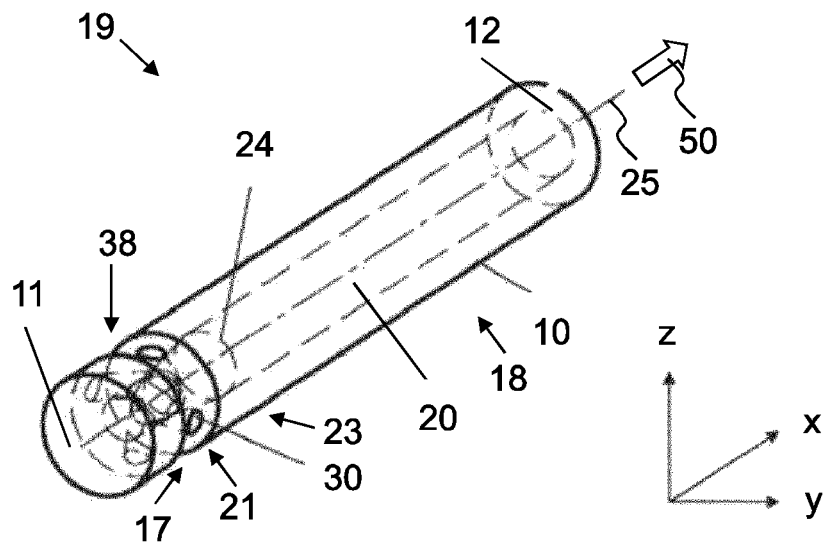
FIG. 1a: shows a perspective view of a rotor shaft arrangement according to one exemplary embodiment of the present invention.

FIG. 1a shows a schematic diagram of a rotor shaft arrangement 19, having a rotor shaft 10 and a fluid passage 20 (depicted in dashed lines) in a perspective view. In the exemplary embodiment shown, a central axis 25 or longitudinal central axis 25 of the fluid passage 20 is identical with a central axis 25, a longitudinal central axis 25 and/or a rotor axis 25 of the rotor shaft 10. In other words, the fluid passage 20 is coaxial with the rotor shaft. Accordingly, a longitudinal extent direction 50 of the fluid passage 20 is parallel to a longitudinal extent direction 50 and/or axial direction 50 of the rotor shaft 10, which, in turn, is parallel to the x axis in a coordinate system depicted at the bottom right in FIG. 1a.

Figure 3:
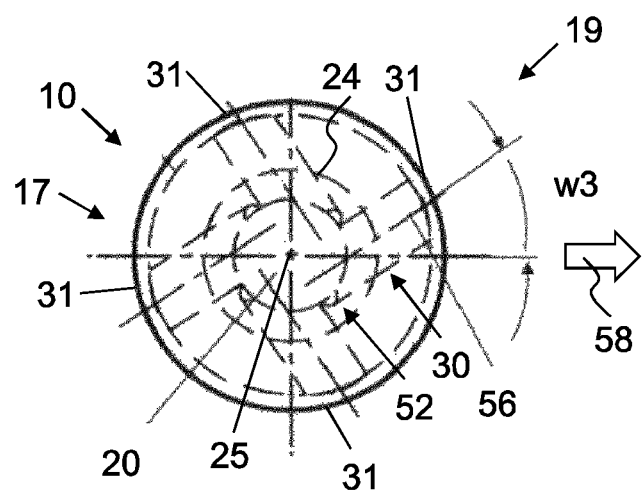
FIG. 3: shows a cross section through the rotor shaft arrangement in FIG. 2.
Figure 5:
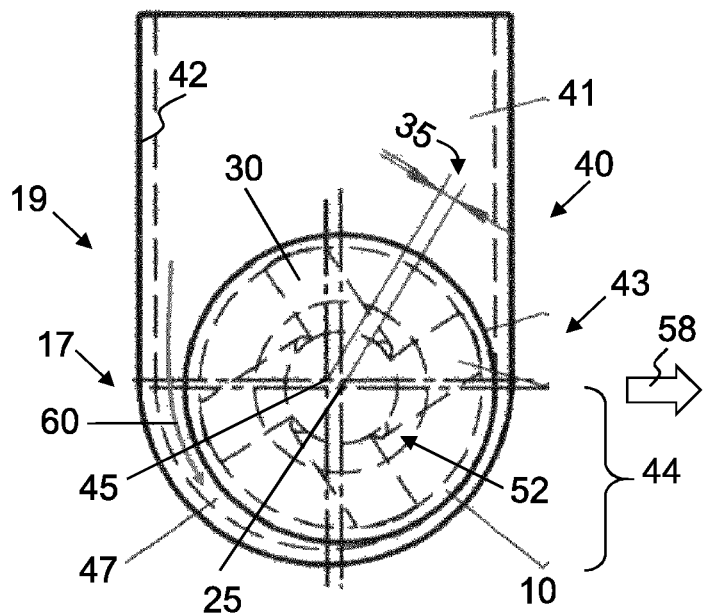
FIG. 5: shows a cross section through the rotor shaft arrangement in FIG. 4.

A cross section plane and/or the cross sections through the rotor shaft 10 which are shown in FIGS. 3 and 5 may extend in a plane parallel to the y-z plane.

The rotor shaft 10 has a first end 11 and a second end 12. Formed at a distance from the first end 11 of the rotor shaft 10 is an annular channel 38, which is arranged at least along part of the outer circumference of the rotor shaft 10. At least one feed channel 30 is arranged in the rotor shaft 10 in the region of the annular channel 38. In this arrangement, the at least one feed channel 30 is arranged at one end 21 of the fluid passage 20. More specifically, the rotor shaft arrangement 19 has a plurality of feed channels 30, which are spaced apart from one another in the circumferential direction of the rotor shaft 10.

Figure 1B:
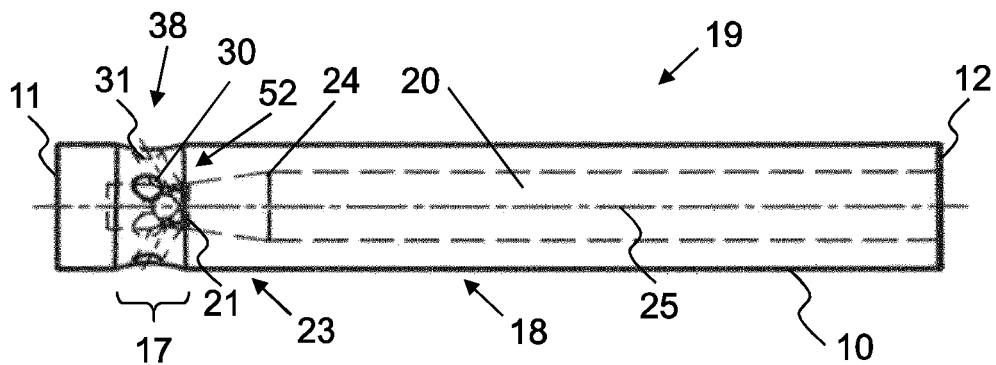

FIG. 1b shows a longitudinal section in the x-z plane of the rotor shaft arrangement 10 in FIG. 1a.

The rotor shaft 10 has a first portion 17, in which the feed channels 30 are arranged and/or the annular channel 38 is formed. The rotor shaft 10 has a second portion 18, in which the fluid passage 20 is arranged. An outside diameter of the first portion 17 is smaller than an outside diameter of the second portion 18 of the rotor shaft 10, with the result that the annular channel 38 is formed in the first portion 17 along an outer circumference of the rotor shaft 10.

As shown in FIG. 1b, the rotor shaft 10 has, in the region of the end 21 of the fluid passage 20, a widening 23, which extends in the longitudinal extent direction 50 of the fluid passage 20 as far as an inflection 24 of the fluid passage 20.

In the region of the end 21 and/or at the end 21 of the fluid passage 20, a plurality of feed channels 30 is arranged adjoining and in fluid communication with the fluid passage 20. The feed channels 30 each have an opening 31 in the region of the annular channel 38 and open into the fluid passage 20 in the region of the end 21 of the fluid passage 20.

As shown in FIGS. 1a and 1b, the feed channels 30 are arranged on the fluid passage 20 so as to form a bend 52, as will be explained in greater detail below.

Figure 2:
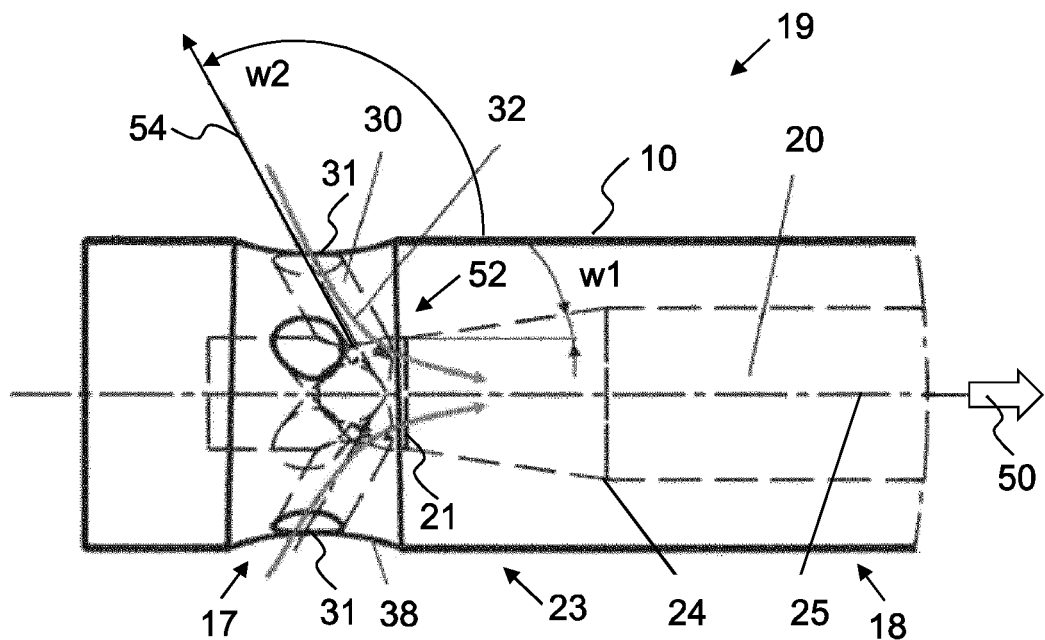
FIG. 2: shows a longitudinal section through a rotor shaft arrangement according to one exemplary embodiment.

FIG. 2 shows a longitudinal section through a rotor shaft arrangement 19 according to one exemplary embodiment. Unless otherwise described, the rotor shaft arrangement in FIG. 2 has the same elements and features as the rotor shaft arrangement 19 in FIGS. 1a and 1b.

The openings 31 of the feed channels 30 are arranged in the region of the annular channel 38. The arrows 32 show the direction in which, via the openings 31, the fluid enters the region of the end 21 of the fluid passage 20 and flows onward through the widening 23 into the fluid passage 20. The widening 23 extends from the end 21 of the fluid passage 20 as far as the inflection 24. An angle w1 indicates the angle of the widening 23. In this context, the angle w1 denotes an angle which is enclosed by a tangent to a wall and/or a lateral surface, facing the longitudinal central axis 25, of the fluid passage 20 and the longitudinal central axis 25.

As mentioned above, the fluid passage 20 and each of the feed channels 30 form a bend 52. In an embodiment, the longitudinal extent direction 54 of each feed channel 30 is transverse to the longitudinal extent direction 50 of the fluid passage, as shown in FIG. 2. In a longitudinal section plane through the rotor shaft 10, as shown in FIG. 2, the bend 52 has a first bend angle w2 between the longitudinal extent direction 54 of the feed channel and the longitudinal extent direction 50 of the fluid passage 20, wherein the first bend angle w2 is between 95° and 175°, in an embodiment is between 100° and 150°, e.g. between 110° and 140°.

FIG. 3 shows a cross section through the rotor shaft arrangement 19 in FIG. 2.

The central axis 25 and/or longitudinal central axis 25 of the fluid passage 20 is shown in the center of the fluid passage 20.

As is clearly visible in FIG. 3, in a cross section plane through the rotor shaft 10, the plane of the drawing in FIG. 3 for instance, the bend 52 of each feed channel 30 has a second bend angle w3 between a projection 56 of the longitudinal extent direction 54 of the feed channel 30 into the cross section plane and a radial direction 58 of the fluid passage 20. In this embodiment, the radial direction 58 of the fluid passage may be parallel to a radial direction of the rotor shaft 10 and/or parallel to a transverse axis of the rotor shaft 10. The second bend angle w3 is between 10° and 80°, in an embodiment is between 30° and 60°, e.g. from 30° to 40°.

The feed channels 30 are thus arranged in such a way at the end 21 of the fluid passage 20 that the bend 52 is formed with the first bend angle w2 and the second bend angle w3. As is seen in FIG. 3, this leads as it were to a longitudinal central axis that is parallel to the longitudinal extent direction 54 of each feed channel 30 being skewed relative to the longitudinal central axis 25 of the fluid passage 20. As a result, effects of the centrifugal force on the fluid are reduced, and better conveyance of fluid via the feed channels 30 into the fluid passage 20 is achieved. Overall, it is thus possible to improve cooling with the fluid.

Figure 4:
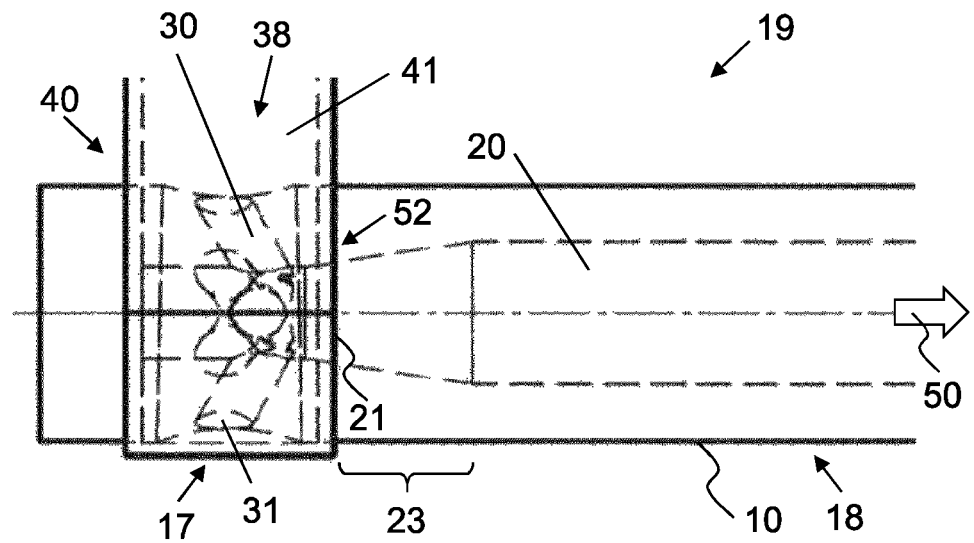
FIG. 4: shows a longitudinal section through a rotor shaft arrangement according to one exemplary embodiment.

FIG. 4 shows a longitudinal section through a rotor shaft arrangement 19 according to one exemplary embodiment.

In the region of the annular channel 38 and/or with the first portion 17, the rotor shaft 10 is arranged in a reservoir 41 and/or a fluid feed 40 having a reservoir 41, wherein the fluid feed 40 may store the fluid. In this case, the openings 31 of the feed channels 30 are arranged in the reservoir 41 and/or the fluid feed 40, and therefore fluid is conveyed out of the fluid feed 40 into the fluid passage 20 via the feed channels 30 when the rotor shaft 10 rotates. The fluid is then transferred onwards through the fluid passage 20 via the widening 23.

FIG. 5 shows a cross section through the rotor shaft arrangement 19 in FIG. 4.

In a lower region 43, the reservoir 41 and/or the fluid feed 40 has a semicircular trough portion 44 having a center of curvature 45 of the trough portion 44. As is clearly apparent in FIG. 5, the central axis 25, the longitudinal central axis 25 and/or the rotor axis 25 are/is arranged eccentrically and/or with an eccentricity 35 and/or a spacing 35 with respect to the center of curvature 45. As a result, there is a gap 47 (see arrow 60) between the semicircular trough portion 44 of the reservoir 41 and the rotor shaft 10 or annular channel 38, the gap tapering in the circumferential direction of the rotor shaft 10 and/or of the annular channel 38. When the reservoir 41 is filled with a fluid and the rotor shaft 10 rotates in the direction of the taper of the tapering gap 47, the fluid is forced into the feed channels 30 of the rotor shaft 10 by the rotary motion of the rotary shaft 10, thereby further improving the fluid feed into the feed channel 30. This is further assisted by the annular channel 38 (see FIG. 4).

In addition, it is to be noted that "comprising" and "have" do not exclude any other elements or steps, and "a" or "an" do not exclude a plurality. Furthermore, it is to be noted that features or steps which have been described with reference to one of the above embodiments may also be used in combination with other features or steps of other embodiments described above. Reference designations are not to be considered to be limiting.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS 10 rotor shaft
11 first end of the rotor shaft
12 second end of the rotor shaft
17 first portion of the rotor shaft 18 second portion of the rotor shaft
19 rotor shaft arrangement
20 fluid passage
21 end of the fluid passage
23 widening
24 inflection
25 central axis of the fluid passage and of the rotor shaft
30 feed channels
31 opening
32 fluid path
35 eccentricity/spacing
38 annular channel
40 fluid feed
41 reservoir
43 lower region of the reservoir
44 semicircular trough portion
45 center of curvature
47 tapering gap
50 longitudinal extent direction of the fluid passage/rotor shaft
52 bend
54 longitudinal extent direction of the feed channels
56 projection of the longitudinal extent direction 54
58 radial direction of the fluid passage/rotor shaft
w1 angle of the widening
w2 first bend angle
w3 second bend angle

What is claimed is:

1. A rotor shaft arrangement for an electric machine, the rotor shaft arrangement comprising:
a rotor shaft;
a fluid passage arranged at least partially within the rotor shaft and is designed to carry a cooling fluid along a longitudinal extent direction of the fluid passage, and the longitudinal extent direction of the fluid passage is parallel to an axial direction of the rotor shaft;
at least one feed channel, which is arranged at least partially within the rotor shaft and is connected to the fluid passage at one end of the fluid passage;
a fluid feed that stores the cooling fluid, and the at least one feed channel provides fluid communication between the fluid passage and the fluid feed; and
a bend, wherein the feed channel is arranged with respect to the longitudinal extent direction of the fluid passage so as to form the bend at the end of the fluid passage;
a widening located at the end of the fluid passage such that the at least one feed channel is in fluid communication with the widening, the widening extends in the longitudinal extent direction of the fluid passage as far as an inflection in the fluid passage;
wherein the widening has an acute angle in relation to the longitudinal extent direction of the fluid passage.

2. The rotor shaft arrangement of claim 1, the bend further comprising:
a first bend angle between a longitudinal extent direction of the feed channel and the longitudinal extent direction of the fluid passage;
wherein the first bend angle is located in a longitudinal section plane through the rotor shaft.

3. The rotor shaft arrangement of claim 2, wherein the first bend angle is between 95° and 175°.

4. The rotor shaft arrangement of claim 2, wherein the first bend angle is between 100° and 150°.

5. The rotor shaft arrangement of claim 2, wherein the first bend angle is between 110° and 140°.

6. The rotor shaft arrangement of claim 1, the bend further comprising:
a second bend angle in a cross section plane through the rotor shaft;
wherein the second bend angle is between a projection of the longitudinal extent direction of the feed channel into the cross section plane and a radial direction of the fluid passage.

7. The rotor shaft arrangement of claim 6, wherein the second bend angle is between is between 10° and 80°.

8. The rotor shaft arrangement of claim 6, wherein the second bend angle is between 30° and 60°.

9. The rotor shaft arrangement of claim 6, wherein the second bend angle is between 30° to 40°.

10. The rotor shaft arrangement of claim 1 wherein the acute angle of the widening is in a range of from 10° to 30°.

11. The rotor shaft arrangement of claim 1 wherein the acute angle of the widening is in a range of from 1° to 15°.

12. The rotor shaft arrangement of claim 1, wherein the acute angle of the widening is in a range of from 1° to 10°.

13. The rotor shaft arrangement of claim 1, the at least one feed channel further comprising a plurality of feed channels, which are spaced apart from one another in at least one of the circumferential direction of the fluid passage or in the circumferential direction of the rotor shaft.

14. The rotor shaft arrangement of claim 1, wherein the rotor shaft is connected to the fluid passage and to the at least one feed channel for conjoint rotation therewith.

15. The rotor shaft arrangement of claim 1, wherein the rotor shaft, the fluid passage, and the at least one feed channel are of integral design.

16. The rotor shaft arrangement of claim 1, the rotor shaft further comprising:
a first portion, in which the at least one feed channel is arranged; and
a second portion, in which the fluid passage is arranged;
wherein an outside diameter of the first portion is smaller than an outside diameter of the second portion of the rotor shaft, forming an annular channel in the first portion along an outer circumference of the rotor shaft.

17. The rotor shaft arrangement of claim 16, further comprising:
a trough-shaped fluid feed; and
a semicircular trough portion being part of the trough-shaped fluid feed, the semicircular trough portion is configured for feeding the cooling fluid to the at least one feed channel of the rotor shaft arrangement;
wherein the first portion of the rotor shaft, in which the annular channel is arranged, is accommodated at least partially in the semicircular trough portion, such that when the rotor shaft rotates, cooling fluid is conveyed out of the fluid feed into the fluid passage via the at least one feed channel.

18. The rotor shaft arrangement of claim 17, the semicircular trough portion further comprising:
a center of curvature;
wherein the first portion of the rotor shaft is arranged in such a way in the semicircular trough portion that the center of curvature of the semicircular trough portion is arranged eccentrically with respect to a rotor axis of the rotor shaft.

* * * * *

UNITED STATES PATENT AND TRADEMARK OFFICE
CERTIFICATE OF CORRECTION

| | | |
|---|---|---|
| PATENT NO. | : 12,294,248 B2 | Page 1 of 1 |
| APPLICATION NO. | : 17/197136 | |
| DATED | : May 6, 2025 | |
| INVENTOR(S) | : Fröhlich et al. | |

It is certified that error appears in the above-identified patent and that said Letters Patent is hereby corrected as shown below:

On the Title Page

Item (30) Foreign Application Priority Data, should read:
Foreign Application Priority Data
September 21, 2018 (DE) ..................10 2018 216 120.8

Signed and Sealed this
Ninth Day of December, 2025

John A. Squires
*Director of the United States Patent and Trademark Office*